United States Patent Office 3,684,558
Patented Aug. 15, 1972

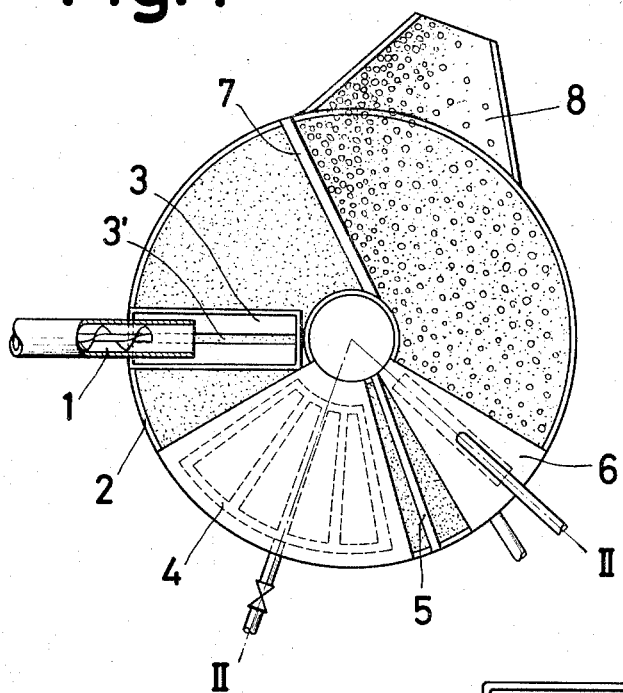
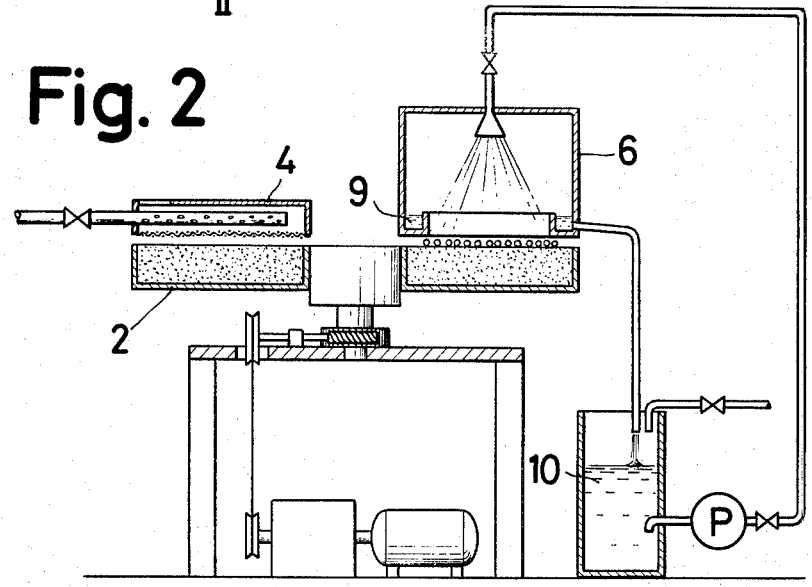

3,684,558
PROCESS OF ENROBING POWDER PARTICLES
Kinjiro Fujii, Komae-machi, Akihiro Motoe, Higashi-murayama-shi, and Homuru Kasugai, Fuchu-shi, Japan, assignors to Agency of Industrial Science and Technology, Tokyo, Japan
Continuation-in-part of application Ser. No. 795,167, Jan. 30, 1969. This application Feb. 3, 1971, Ser. No. 112,109
Claims priority, application Japan, Feb. 2, 1968, 43/6,049
Int. Cl. B44d 1/08
U.S. Cl. 117—100 B
5 Claims

ABSTRACT OF THE DISCLOSURE

Droplets of an aqueous solution or slurry containing a potentially tacky substance are sprayed over a powder bed of a refractory material preheated to about 200° C.–700° C., while precautions are taken to insure that the droplets do not combine. The water in the droplets thus boils on said powder bed, with the result that the tacky substance in the droplets enrobes particles of powder while the water evaporates. The enrobed particles gradually solidify into porous grains.

REFERENCE TO COPENDING APPLICATION

This is a continuation-in-part of our copending application Ser. No. 795,167, filed Jan. 30, 1969, now abandoned.

BACKGROUND OF THE INVENTION

This invention relates to a method for the production of refractory porous grains or bodies.

Refractory hollow spherical bodies or light-weight aggregates have been used as raw material for fire bricks and the like after being shaped under pressure together with an appropriate binder. At present, hollow spherical bodies of aluminum or zirconia, for example, are produced on a commercial basis by melting the raw material in an electric furnace, allowing the resulting melt to flow out in the form of a streamlet from the furnace and blowing air or the like against the streamlet. This, however, is not an advantageous method, considering the difficulty in operation, electric charges, and the like. Also, fire-resistant light-weight aggregates are produced by comminuting the once-burnt light-weight blocks and screening the resultant grains of the desired size. This, however, is uneconomical since the yield of the grains of the required size is low.

A primary object of this invention is to provide a method of producing light-weight porous grains or bodies which are superior in thermal and mechanical characteristics economically by eliminating the disadvantages in conventional methods.

SUMMARY OF THE INVENTION

According to this invention, an aqueous solution or slurry containing a potentially tacky substance is sprayed in the form of separate droplets over a bed of powder particles of a refractory material heated to about 200° C.–700° C. while insuring that the droplets do not combine, the substance in the droplets becoming tacky within this temperature range. The water on the droplets boils and is evaporated by the heat of the powder bed, with the result that the tacky substance in each droplet enrobes particles of powder while the water contained therein evaporates and becomes a binder so as to form spherical porous grains. The porous grains thus formed are then separated from the powder bed and burnt to obtain sintered porous grains.

The components of the resulting porous grains depend upon the potentially tacky substance in the water droplets and the kind of refractory material of the powder bed used. Useful refractory materials include silica, alumina, grog, magnesia, zirconia, zircon, chromite, silicon carbide, and the like separately or in mixtures. The grain size of the powder must be fine enough to pass through a sieve of about 50 meshes since, if the powder is too coarse, the texture of the resulting porous grains becomes coarse.

The powder bed is heated to 200° C.–700° C. while in motion and the water droplets containing the potentially tacky substance are then sprayed over the moving powder bed while insuring that the droplets do not combine. The droplets tumble about as droplets dropped on a heated frying-pan boil and tumble. Because of the evaporation of the water, the aqueous solution or slurry gradually increases in viscosity, thereby enabling the tacky substance in the boiling bubbles to enrobe particles of powder and act as a binder to form porous grains as the water is evaporated. The term "potentially tacky" is understood to mean any substance which becomes tacky under the elevated temperatures.

A good aqueous solution may be made of such potentially tacky substances as primary aluminum phosphate, aluminum oxychloride, zirconyl acetate, sodium silicate or sodium aluminate. As a slurry, use may be made of a crude clay slurry containing kaolinite, montmorillonite, sericite, illite, and the like. An aqueous solution or slurry in which the above components have been mixed may also be used. Further, use may be made of such potentially tacky substances as pulp waste liquor or thermosetting resins, including ureaformaldehyde or phenolformaldehyde.

The potentially tacky substance is used in the aqueous solution or slurry in a concentration of about 5% to about 60%. It is preferable that the slurry contain clay in a concentration ranging from about 10% to about 60%, that the aqueous solution of primary aluminum phosphate have a concentration of 10–50% and that the thermosetting resin or pulp waste have a concentration ranging from 10% to 50%. If the concentration of the potentially tacky component is lower than 5%, the porous grains, even if formed, are so fragile as to be difficult to handle. If, by contrast, the concentration is more than 60%, the fluidity of the sprayed solution of slurry becomes so low that it is difficult to eject the solution from a spray nozzle.

The size of the droplets to be sprayed is decided in accordance with the size of the porous grains to be produced and is within the range of about 0.2 mm. to 3 mm. If it is lower than 0.2 mm., there is a danger of the water being evaporated before particles of powder are sufficiently enrobed. If it is more than 3 mm., there is a danger of the water not being completely evaporated. According to the present invention, special attention is given to preventing the droplets from combining by regulating the quantity of solution or slurry sprayed, regulating the velocity of the heated powder bed and providing the spray nozzles at appropriate intervals. By such means, it is possible to obtain porous grains having an almost uniform diameter, if the size of the droplets is kept constant. These operating parameters are readily adjusted by those skilled in the art without undue experimentation.

Though the size of porous grains is determined by the size and kind of the droplets sprayed, the size of the powder, the bed temperature, etc., the preferable size is between about 0.5 mm. and about 5 mm.

The surface temperature of the powder bed over which the droplets are to be sprayed is about 200° C.–700° C. The higher the temperature, the more active the boiling and tumbling about of the droplets, with the result that porous grains of high porosity are obtained and, at the same time, the solidifying time is reduced. Needless to say, the solidifying time depends upon the size of the droplets; the finer the size of the droplets, the more quickly they solidify into porous grains. If the bed temperature is more than 700° C., problems will occur in connection with choosing materials for the apparatus. It will, for example, be difficult to use metallic materials for the scraper.

Other objects and characteristics of this invention will be explained in detail hereunder by referring to the accompanying drawing.

BRIEF EXPLANATION OF THE DRAWING

FIG. 1 is a top plan view of an apparatus for carrying out the method of this invention; and FIG. 2 is a sectional view taken at line II—II of the apparatus shown in FIG. 1.

DETAILED DESCRIPTION

A refractory powder is conveyed from a hopper (not shown) through a screw feeder 1 to a pit 3 in a rotary disc 2, and is then fed therefrom continuously to the rotary disc so as to form a bed having a fixed thickness at a feed gate 3' provided at the bottom of the pit. The powder fed onto the rotary disc 2 moves on as the disc rotates. While moving, the powder is heated at its surface to about 200° C.–700° C. by a burner 4, and passes through an insulating plate 5. An aqueous solution or slurry containing a potentially tacky substance is then sprayed in the form of droplets over the powder bed from a spray chamber 6 while precautions are taken to insure that the droplets do not combine. Upon contact with the heated powder, the droplets sprayed are boiled, with the result that they tumble about to enfold particles of powder while the water contained therein evaporates and porous grains are gradually formed. The porous grains formed on the powder bed are then scraped off the surface layer of the powder bed by a scraper 7, recovered through a chute 8 and separated from any particles of powder by a sieve.

If the powder is not sufficiently heated by the burner 4 alone, then the raw material powder may be pre-heated to the desired temperature and then fed to the pit.

To insure that the droplets sprayed do not combine, a slit is provided on the bottom of the spray cylinder 6 to limit the amount of the solution or slurry sprayed, and the excess solution or slurry which has not passed through the slit is recycled through sump 9 into a feed tank 10.

In this apparatus, all the steps, i.e. feeding the fire-resistant powder, heating the surface thereof, spraying the droplets, and scraping the porous grains, can be carried out continuously, and the combining of the droplets sprayed over the powder bed can easily be avoided by appropriately controlling the spraying velocity of the droplets and the rotation velocity of the rotary disc.

If the velocity of the rotary disc is high, the resulting porous grains remain soft even when they are scraped. However, because the grains are scraped together with the surface layer of the powder bed by the scraper, they, even after recovered through a chute into a recovery box, still continue to be boiled by the latent heat of the coexisting powder and, while evaporating the water contained therein, gradually solidify.

The porous grains thus obtained consist of the potentially tacky substance and the particles of powder of the powder bed, and the properties thereof depend largely upon the combination of the kinds of materials used. For example, porous grains obtained by spraying a crude clay slurry over a grog bed of clay matter as a powder bed can be made into fire-resistant light-weight aggregates containing mullite as the component and having spalling resistance even after burning; also, porous grains obtained by spraying an aluminum phosphate solution over a powder bed of alumina are very strong even in that condition, and, moreover, because they do not contain metal oxides other than alumina, they are superior in thermal resistance; and porous grains obtained with the combination of silica powder with waterglass solution are easily transformable in burning into cristobalite which is superior in resistance against softening under load. Further, the ratio of the potentially tacky substance to the particles of powder in the porous grains varies much according to the operating conditions. For example, in the case where use is made of a crude clay slurry, if the solid concentration of the slurry is high, more than 50% by weight of the resulting solidified porous grains is occupied by the crude clay from the slurry, this being specially striking when the powder bed temperature is low (for example, 200° C.). To the contrary, when the operation is carried out by elevating the powder bed temperature (for example, to above 500° C.), the resulting porous grains consist essentially of the particles of powder of the powder bed, the crude clay as a binder being confined to less than 20% by weight.

The porous grains solidified in a state containing sufficient amounts of the binder (the potentially tacky substance) are naturally high in dry strength, so they are hardly damaged in handling. In particular, when a crude clay-type material is used as a binder, it is possible to obtain porous grains which will not be easily broken even if pressed between the finger tips. When the porous grains thus obtained are burnt as they are, at about 1400° C., they turn into fire-resistant porous grains. When the porous grains are formed into an appropriate shape by using an appropriate binder, for example, a grog clay or the like, and thereafter burnt at 1400° C., superior porous bodies are obtained.

The following examples are further illustrative of this invention, and it will be understood that the invention is not limited thereto.

EXAMPLE 1

Porous grains of clay matter were prepared by using droplets of an aqueous slurry containing a potentially tacky substance with crude Kibushi clay as the main component, using as the powder bed a bed of grog which had passed through a sieve of 100 meshes, and using the apparatus shown in the drawing.

The slurry consisted of 300 g. of crude Kibushi clay, 200 g. of the grog powder, 15 g. of sodium carbonate as a deflocculant, 30 g. of pulp waste liquor (concentration 50%, Na base), 15 g. of sodium alkylbenzenesulfonate as a foaming agent, said sodium containing 30% of an effective component and not containing a builder, and 500 g. of water. This slurry was sprayed in the form of droplets of about 0.2–2 mm. in diameter at a rate of 2.5 kg./hr. to the rotary disc. The details of the apparatus and the operating conditions were as follows: The diameter of the rotary disc was 50 cm.; the width of the powder bed was 20 cm.; the rotation velocity was 3 r.p.m.; the powder feeding velocity was 7.5 kg./hr.; the surface temperature of the powder bed directly below the burner was 450° C.; and the temperature of the surface powder layer at the scraper was 350° C.

The droplets sprayed were boiled on the heated surface of the powder bed, thereby tumbling about while evaporating the water contained therein. Of the resulting porous grains, small ones (less than 2–3 mm.) solidified before reaching the scraper, and large ones continued releasing water vapor even after having entered the recovery box from the rotary disc.

The porous grains of clay matter thus obtained, when calculated from the amounts of the slurry consumed and of the porous grains produced, consisted, by weight, of 73% of the slurry solid and 27% of the grog powder. All, containing a large number of bubbles, showed a honeycomb structure; the average bulk density of those having a size of from 5.66 mm. (3.5 meshes) to 0.589 mm. (28 meshes) was 0.34 g./cm.$^3$; the larger in size, the lighter in weight. The porous grains showed strength high enough to make one feel much resistance in breaking them down by pressing with the finger tip.

EXAMPLE 2

This example is concerned with the production of porous grains by use of a bentonite slurry as the spraying solution and the grog bed in Example 1 as the powder bed.

Using a slurry of 500 g. of bentonite in 2500 g. of water (solid concentration 16.7%) and feeding the grog heated to about 250° C. to the pit in advance, the operation was carried out under the conditions that the surface temperature of the powder bed directly below the burner was 650° C., the velocity of the rotary disc was 6 r.p.m., and the feeding velocity of the spraying solution was 4.6 kg./hr. The porous grains obtained, when calculated from the amounts of the spraying slurry consumed and of the porous grains produced, consisted, by weight, of 9.2% of the bentonite and 90.8% of the grog powder. Of the porous grains produced, those having a size of from 0.589 mm. to 5.66 mm. had an average bulk density of 0.50 g./cm.$^3$, and, in section, showed a honeycomb structure. Upon burning at 1400° C., these crude porous grains came to have a bulk density of 0.55 g./cm.$^3$ and showed strength as high as to the extent that it was hard to break them down by pressing with the finger tip. Incidentally, in this example, the concentration of the bentonite solution was set at 16.7% but, even by using a diluted 5% solution, porous grains could likewise be produced. However, the lower the concentration, the lower the strength of the resulting porous grains.

EXAMPLE 3

In this example, porous grains of alumina were prepared by using an aqueous solution containing primary aluminum phosphate as a potentially tacky substance and spraying said solution over a bauxite powder bed.

The aqueous solution of primary aluminum phosphate used herein had a concentration of 23.3% by weight as $Al(H_2PO_4)_3$ and contained about 1.03% of excess phosphoric acid (as $P_2O_5$). The bauxite powder was white bauxite from South Africa, which was burnt at about 1500° C. and thereafter reduced to powder fine enough to pass through a sieve of 100 meshes. The operation was carried out by using the same apparatus as in Example 1 and under the conditions that the rotation velocity was 1 r.p.m., the feeding velocity of the bauxite powder and of the spraying solution was 6.5 kg./hr. and 1.2 kg./hr., respectively, and the surface temperature of the powder bed directly below the burner was 450° C.

Of the porous grains of alumina obtained, those having a size within the range of 0.589 mm.–5.66 mm. had an average bulk density of 0.68 g./cm.$^3$, and, when broken down, showed an internal structure in hollow or honeycomb form, all of said porous grains being high in strength and hardly broken down by pressing with the finger tip. Upon further burning of these porous grains at the respective temperatures of 500° C. and 1500° C., the strength increased, and, because of the alumina, the fire-resistance was so high that the grains, even when burnt at 1700° C., showed little or no sign of deformation due to softening.

Incidentally, when, in place of the primary aluminum phosphate solution, use was made of a slurry containing 20% by weight of crude Kibushi clay and 15% of aluminum oxychloride ($Al(OH)_{2.3}Cl_{0.7}$), porous grains the properties of which were substantially the same as above, with the exception that the fire resistance slightly decreased, were likewise obtained.

EXAMPLE 4

This example is concerned with the production of porous grains by use of a silica powder bed as the fire-resistant powder bed and a sodium silicate solution as the spraying solution.

The silicate powder used was one obtained by reducing quartz to powder fine enough to pass through a sieve of 100 meshes, and the spraying solution was a mixture of a sodium silicate solution the concentration of which was 10% (silicic acid to sodium ratio 2.54) and 2% of the bentonite in Example 2. The operation was carried out under the same conditions as in Example 3, with the result that porous grains having an average bulk density of 0.48 kg./cm.$^3$ were obtained. Incidentally, when the sodium silicate solution alone was used, it was observed that the bulk density of the resulting porous grains tended to increase (about 0.6 g./cm.$^3$). The porous grains obtained were all sintered fully at a low temperature (about 1100° C.).

EXAMPLE 5

This example is concerned with the production of porous grains by use of a burnt dolomite powder bed as the fire-resistant powder bed and a urea-formaldehyde solution as the spraying solution.

The burnt dolomite powder used was one obtained by reducing burnt dolomite clinker to powder fine enough to pass through a sieve 100 meshes, and the spraying solution was a solution prepared with urea-formaldehyde produced by Mitsuitoatsu Chem. Co. The concentration of the urea-formaldehyde was 30%. The operation was carried out under almost the same conditions as in Example 3, the surface temperature of the powder bed directly below the burner being 280° C., with the result that porous grain having an average bulk density of 0.49 g./cm.$^3$ was obtained. These crude porous grains were burned at a temperature of 1450° C. thus producing hard sintered porous grains having an average bulk density of 0.81 g./cm.$^3$.

In place of the urea-formaldehyde solution, a solution prepared with phenol-formaldehyde produced by Mitsuitoatsu Chem. Co. and having a concentration of 35% was used as the spraying solution to obtain porous grains having almost the same properties as when a urea-formaldehyde solution was used.

We claim:
1. A process for the production of porous grains, which comprises the steps of
   (1) spraying through a slit in a container separate water droplets containing a potentially tacky substance selected from the group consisting of primary aluminum phosphate, aluminum oxychloride, zirconyl acetate, sodium silicate, sodium aluminate, a thermosetting resin and clay over a bed of powder particles of a refractory material selected from the group consisting of silica, alumina, grog, magnesia, zirconia, zircon, chromite and silicon carbide,
      (a) the droplets having a diameter of about 0.2 mm. to 3 mm.,
      (b) the solids concentration of the droplets ranging from about 5% to about 60%, and
      (c) the powder particles having a size lower than 50 mesh;
   (2) maintaining the bed of powder particles at a temperature in the range of 200° C. to 700° C. while the sprayed droplets contact the bed;
   (3) regulating the amount of the water droplets in relation to the amount of the contacted powder particles so as to prevent the water droplets from combining on the powder bed
      (d) whereby the droplets boil on the bed and the water contained therein is evaporated in contact with the powder bed while the potentially tacky substance becomes tacky and enrobes particles of powder therein to form porous grains consisting of the enrobed particles and the enrobing tacky substance;
   (4) separating the porous grains from the powder bed; and
   (5) permitting the porous grains to cool until the potentially tacky substance loses its tackiness.
2. The process of claim 1, wherein the water droplets are formed by a clay slurry having a solids concentration of about 10% to about 60%.

3. The process of claim 1, wherein the water droplets are formed by an aqueous solution of primary aluminum phosphate having a solids concentration of about 10% to about 50%.

4. The process of claim 1, wherein the water droplets are formed by an aqueous solution of a thermosetting resin having a solids concentration of about 10% to about 50%.

5. The process of claim 1, wherein the thermosetting resin is a urea- or phenol-formaldehyde resin, or is contained in pulp waste liquor.

References Cited

UNITED STATES PATENTS

| | | | |
|---|---|---|---|
| 2,786,772 | 3/1957 | Stewart et al. | 264—43 |
| 2,799,074 | 7/1957 | Garloni | 264—43 |
| 3,083,411 | 4/1963 | Glass | 264—7 |
| 3,184,371 | 5/1965 | Seidl | 264—42 |
| 3,095,312 | 6/1963 | Holmes | 264—42 |
| 3,207,588 | 9/1965 | Slayter et al. | 264—43 |
| 3,255,282 | 6/1966 | Shaffer | 264—7 |
| 3,259,171 | 7/1966 | Siemssen | 261—13 |
| 2,870,039 | 1/1959 | McReynolds | 117—100 X |
| 2,734,002 | 2/1956 | Schoeld et al. | 117—100 |
| 3,533,829 | 10/1970 | Quanquin | 117—100 X |
| 3,464,839 | 9/1969 | Gamble | 117—123 |
| 3,408,746 | 11/1968 | Reynolds et al. | 117—100 X |
| 3,287,472 | 11/1966 | Wolf et al. | 264—13 |
| 1,963,030 | 6/1934 | Powell | 264—42 |
| 2,015,381 | 9/1935 | Harding | 264—43 |
| 2,543,987 | 3/1951 | Ramsay | 264—43 |
| 2,676,892 | 4/1954 | McLaughlin | 264—43 |
| 2,699,409 | 1/1955 | Hashimoto | 264—43 |

OTHER REFERENCES

Canadian Paint and Varnish, vol. 37, No. 4, p. 25, April 1963.

WILLIAM D. MARTIN, Primary Examiner

M. R. P. PERRONE, JR., Assistant Examiner

U.S. Cl. X.R.

117—5.5, 100 S, 104 R, 123 A, 123 B, 123 D, 161 L, 161 LN, 169 R, 169 A; 118—303